March 11, 1924. 1,486,431
J. N. HARVEY
DEVICE FOR THE PLANTING AND TRANSPLANTING OF SEEDLINGS
Filed Aug. 22, 1921
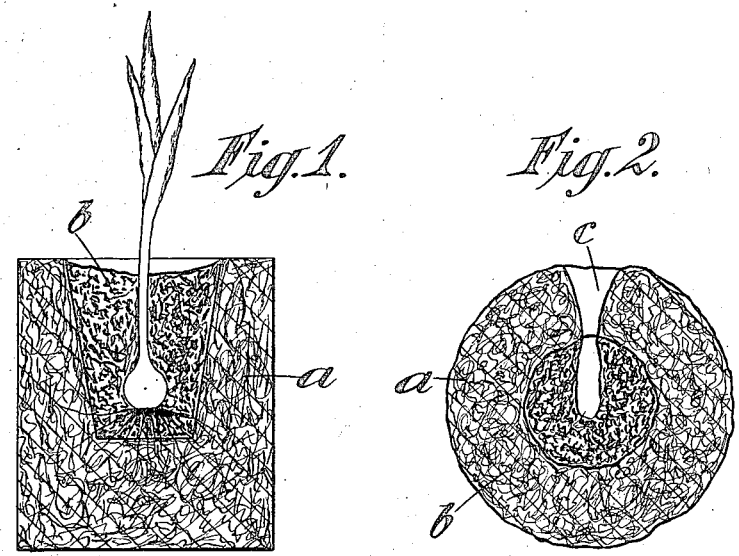
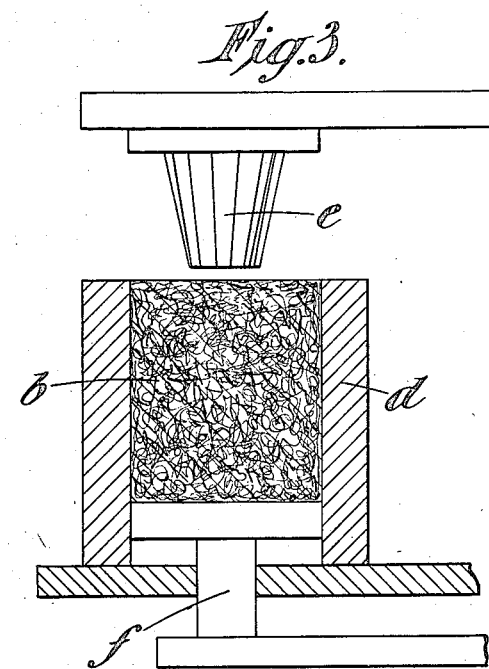

Patented Mar. 11, 1924.

1,486,431

UNITED STATES PATENT OFFICE.

JOHN NOEL HARVEY, OF EVESHAM, ENGLAND.

DEVICE FOR THE PLANTING AND TRANSPLANTING OF SEEDLINGS.

Application filed August 22, 1921. Serial No. 494,184.

*To all whom it may concern:*

Be it known that I, JOHN NOEL HARVEY, a subject of the King of Great Britain and Ireland, and a resident of Evesham, county of Worcester, England, have invented a certain new and useful Improvement in Devices for the Planting and Transplanting of Seedlings, of which the following is a specification.

This invention relates to the planting and transplanting of seedlings, and has for its object to provide means which will be found of particular advantage for use by nurserymen and others requiring to despatch seedlings by post or rail to customers at a distance, the plants being easy to handle, light and easy to pack and remaining fresh and in growing condition during transit whether on short or long journeys.

In accordance with this invention, balls of a size to suit the size of the seedlings under treatment are formed with a centre of good potting mould which is enclosed or enveloped in moss or a suitable fibrous material, and into which balls the roots of the seedlings are inserted when removed from under glass. Or, said envelope may be formed of a mixture of lime or clay and fibre, or other suitable material, with a small quantity of artificial or natural manure added.

The envelope is not necessarily of ball shape, but may be rolled or formed into a hemisphere, cube, cup or other convenient shape.

If of ball shape, a hole is pierced from the circumference, well into the mould in the centre, and the roots of the seedlings are placed therein. The ball is then squeezed in the hand, and the roots and the envelope may be made to serve as a flower pot, whilst it will be obvious that seeds may be sown directly in the balls, cups or the like, and thus avoid the necessity of transference later from boxes to said envelopes.

The seedlings with their roots encased in the balls or the like aforesaid, may be packed in baskets, boxes or the like, and the plants will be delivered in a condition fit for planting, the soil not becoming detached from the roots. Or, as received, they may be left standing upright loosely in the box and if slightly watered, will retain their freshness, and will not wither when planted.

The invention will be the more readily understood by referring to the accompanying sheet of drawings wherein:—

Figure 1 is a vertical section through a rectangular or cubical device constructed in accordance with this invention.

Figure 2 is a similar view through such a device of a ball shape, and

Figure 3 is a sectional view of an apparatus for moulding the evelope members into a shape such as is shown in Figure 1.

Referring to Figures 1 and 2, $a$ represents the outer envelope, $b$ the potting mould inserted therein, and $c$ the hole formed for the reception of the plant.

Referring to Figure 3, $d$ represents the container for the fibrous or like material $b$, $e$ is a die which is pressed thereinto, and $f$ is a member which is given an upward movement to eject the envelope members after such operation.

I claim:—

An article of the class described including an outer shell of fibrous material and a core of potting mold nested within said shell and having a seed or bulb receiving slot extending laterally through the same and also through the outer shell.

In testimony whereof I have affixed my signature hereto this fourth day of August, 1921.

JOHN NOEL HARVEY.